(12) United States Patent
Okuta et al.

(10) Patent No.: US 6,208,457 B1
(45) Date of Patent: Mar. 27, 2001

(54) OPTICAL FIBER COUPLER, METHOD FOR PRODUCING THE SAME AND OPTICAL AMPLIFIER USING THE SAME

(75) Inventors: Michitaka Okuta; Hiromi Ajima, both of Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/220,874

(22) Filed: Dec. 23, 1998

(30) Foreign Application Priority Data

Dec. 26, 1997 (JP) .................................................. 9-360091
Aug. 31, 1998 (JP) ................................................ 10-244285

(51) Int. Cl.[7] ....................................................... H01S 3/00
(52) U.S. Cl. .............................................. 359/341; 385/96
(58) Field of Search ................................ 385/96; 359/341

(56) References Cited

U.S. PATENT DOCUMENTS

| 5,171,345 | * | 12/1992 | Takemura ............................... 65/4.21 |
| 5,299,274 | * | 3/1994 | Wysocki et al. ......................... 385/96 |
| 5,408,555 | * | 4/1995 | Fielding et al. ........................ 385/43 |

FOREIGN PATENT DOCUMENTS

| 0404152A2 | 12/1990 | (EP) | .............................. H01S/3/094 |
| 2 256 723 | * 12/1992 | (GB) . | |
| 03110525 | 5/1991 | (JP) | ................................. G02F/1/35 |
| 03123323 | 5/1991 | (JP) | ................................. G02F/1/35 |
| 3-168726 | * 7/1991 | (JP) . | |
| 03214125 | 9/1991 | (JP) | ................................. G02F/1/35 |
| 4-271329 | * 9/1992 | (JP) . | |
| 06059153 | 3/1994 | (JP) | ................................. G02B/6/28 |

* cited by examiner

*Primary Examiner*—Mark Hellner
(74) *Attorney, Agent, or Firm*—Hogan & Hartson, LLP.

(57) ABSTRACT

In an optical amplifier wherein pumping laser light and signal laser light are multiplexed and supplied as input to a fiber doped with a rare earth element, by decreasing the number of connected sections, loss due to the connection to the rare earth-doped fiber is decreased, thereby to improve the amplifying characteristics and to simplify the production step. a pair of fibers, each which is connected by a transmitting optical fiber 1 and a rare earth-doped fiber 4, at a connected sections, are heated and fused with each other are aligned in part length to a fused jointed portion 3 which is stretched in the vicinity of the connected section 2 on the rare earth-doped fiber side, thereby forming an optical coupler.

10 Claims, 4 Drawing Sheets

OPTICAL FIBER COUPLER, METHOD FOR PRODUCING THE SAME AND OPTICAL AMPLIFIER USING THE SAME

BACKGROUND OF THE INVENTION

1. Field of the Invention

The present invention relates to an optical fiber coupler used in the field of optical communications, a method for manufacturing the optical fiber coupler and an optical amplifier using the same.

2. Prior Art

In optical communication systems, optical fiber amplifiers have been used for directly amplifying light signals.

In a conventional optical fiber amplifier, for example, as shown in FIG. 7, a rare earth doped optical fiber 1b from a pumping light source 6 through a splicing portion 9 and another optical fiber 1a for input of signal light have been connected by fusing to a side of the multiplexer (WDM) 7. The rare earth-doped fiber 4 for output of the amplified signal has been connected on the other side of the multiplexer. These doped fibers are doped with a rare earth element such as Er or Nd in the optical material of the core fiber.

In general, for the amplifier, a passive component such as inline-type optical isolator 8 has been connected to the doped fiber 4 via another splicing portion 9 by fusing on the output side of the said multiplexer (WDM) 7, as shown in FIG. 7.

The multiplexer 7 comprises a transmission optical fiber which transmits light from the pumping light source 6 having wavelength shorter than the signal light. One end of the transmission fiber is connected through splicing portion 91 with the rare earth-doped fiber 4 which on the out put side is connected in a splicing portion 92 with a single-mode fiber 1 of the inline type optical isolator 8.

In such an optical amplifier, the multiplexer 7 multiplexes the signal light and the pumping light wherein both light rays enter the rare earth-doped fiber 4 so that the pumping light pumps rare earth ions in the rare earth-doped fiber 4, thereby generating the state of reversed distribution of energy level and amplifying the signal light. The amplified signal light is orientated by the inline type optical isolator 8 to the output side.

However, in the optical amplifier described above, every fiber type device constructing the amplifier is connected by fusing in the splicing portions 9, 91 and 92, and therefore, fabrication of such an amplified has required much labor for splicing fibers by fusing. Connection of fibers each other also leads to a loss in optical power, then resulting in decreased gain and deteriorated signal to noise ratio, which are to be detrimental for optical amplification.

In the construction of the prior art amplifier above, since the signal light and the pumping light enter the rare earth-doped fiber 4 after being multiplexed in the multiplexer 7, it has been difficult to connect the fibers while setting the different mode field diameters of the optical fibers. Also it has been necessary to secure a space for accommodating the splicing portions 9, 91 and 92 when installing the optical circuit as a amplifier module, thus causing a problem of increased space for installing the optical circuit.

SUMMARY OF THE INVENTION

An object of the present invention is to provide an optical fiber coupler which is compact and can be constructed easily through the connection of a plurality of optical fibers.

Another object of the present invention is to prevent optical loss from taking place in the joint portion of the optical fiber coupler and to improve the signal to noise ratio.

Further, another object of the present invention is to provide an optical amplifier equipped with the optical fiber coupler which is compact and can be constructed easily through the connection of a plurality of optical fibers.

A further object of the present invention is to provide an optical amplifier in which decrease in amplification due to the fiber coupler and deterioration in the signal to noise ratio are prevented.

In order to achieve the objects described above, in the present invention, an optical coupler is formed such that two transmitting optical fibers are connected to a single common fiber on its end and the other end of the single joint fiber is connected to at least one doped optical fiber, wherein part or all of the single common fiber comprise a doped fiber aligned to the at least one doped optical fiber.

for such a optical coupler, typically, one and the other of a pair of the transmitting optical fibers are used for entering signal laser light and pumping laser light, respectively, into the single common rare-earth doped fiber where the two laser rays are multiplexed, then the doped optical fiber is used to output the multiplexed signal light.

The optical coupler can be formed by heating partial regions of a pair of parallel fibers each of which comprises a rare earth-doped fiber and a transmission fiber which have connections formed by abutting their ends, to integrally join partial lengths of the pair of fibers into a fused and elongated portion as a single common fiber which includes the connections of each fiber, then divaricating the two branch transmission fibers from the fused and elongated portion.

In the invention, the fused and elongated portion can be stretched in a softened state to adjust fiber diameter of the fused and elongated portion as required to obtain each mode field diameter of each light in the portion.

A method of such an optical coupler comprises forming plurality of optical fibers by abutting and fusing the ends of a transmission optical fiber and a rare earth-doped fiber with each other, disposing the plurality of optical fibers in parallel contact with the connected sections between the transmission optical and the rare earth-doped fibers and fusing the connected sections and their vicinities on the fibers while stretching the fibers, thereby integrating the fused optical fibers to a fused and elongated portion as a single joint fiber portion having rare earth-doped fiber material and desired fiber diameter.

Also according to the present invention, an optical amplifier of a simple construction without splicing portion is provided by using the optical fiber coupler described above.

BRIEF DESCRIPTION OF THE DRAWINGS

Preferred embodiments of the present invention will now be described below with reference to the accompanying drawings, in which.

DESCRIPTION OF THE PREFERRED EMBODIMENTS

Figure 1A:
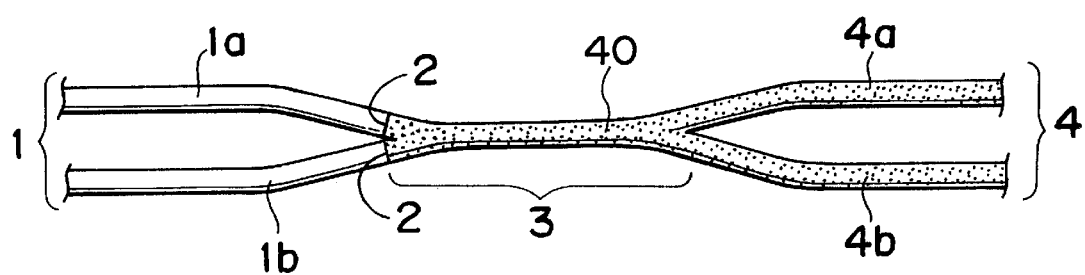
FIG. 1A is shows a plan view of an optical fiber coupler of an embodiment according to the present invention.
Figure 1B:
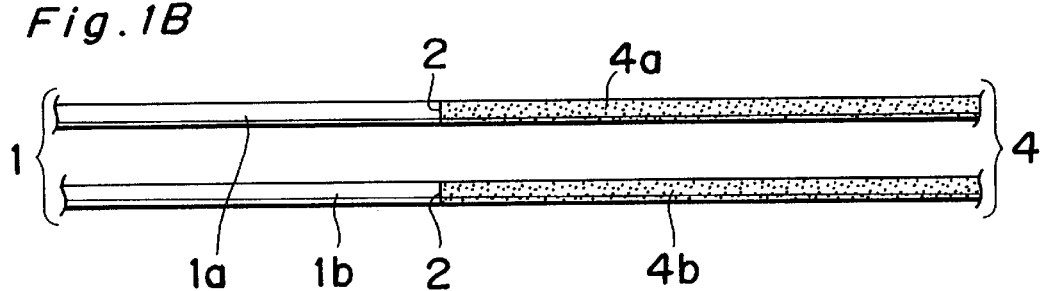
FIG. 1B shows two optical fibers for producing such an optical fiber coupler as shown in FIG. 1A.

In FIG. 1A, an optical fiber coupler is constructed by connecting light transmission fibers 1a and 1b, and a rare earth-doped fiber 4 by means of a fused and elongated portion 3, i.e. fused-stretched portion. In this example, as shown in FIG. 1B, a pair of optical fibers are used each which is connected by fusing the ends of fiber cores of the ordinary light transmission fiber 1a or 1b and the rare earth-doped fiber 4a and 4b, respectively.

The connected section 2 is made by abutting coaxially ends of the core of the single-mode optical fibers 1a and 1b and the core of the rare earth-doped fibers 4a and 4b and heating the abutted ends several times to connect the cores.

This causes the additives which increases the refractive index of the core in the heated portion to diffuse, thereby increasing the mode field diameter in the connected section 2 and decreasing the connection loss.

Then the two optical fibers of the transmitting and the rare earth doped optical fibers, which have been connected, are aligned at the connected sections 2, brought into contact with each other, then heated to fuse them together and then stretched until achieving the coupling length. The two connected sections 2 are positioned for the purpose of making the propagation constants identical between the two fibers which constitute the fused and elongated portion 3 during stretching. Otherwise, the fibers would not fully couple with each other, thus failing to achieve the multiplexer function.

Thus, the optical fiber coupler shown in FIG. 1A can be fabricated as described above. Thus the optical fiber coupler of such a construction is obtained as the two branched ordinary transmitting optical fibers 1a and 1b are connected on one side of the stretched fused and elongated portion 3 as a common single joint fiber with the two rare earth-doped fibers 4 on the other side. Then, the fused and elongated portion 3, which includes the connected section 2, may be located on the rare earth-doped fiber side in the vicinity thereof.

The fused and elongated portion 3 formed by fusing-stretching may be located in the rare earth-doped fiber 4 side. The distance between the fused and elongated portion 3 and the connected section 2 of the single mode fiber may be set in a range of about 5 to 15 mm. In case the distance is beyond this range, signal light entering the rare earth-doped fiber is attenuated before being coupled with the pumping light.

Figure 2:
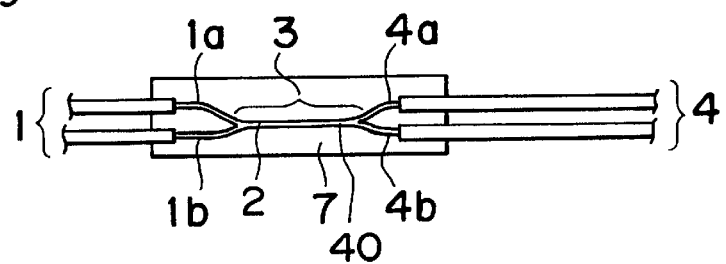
FIG. 2 is a plan view showing an optical fiber coupler of the present invention packaged on a substrate.

The fibers which have been jointed by fusing in this manner are mounted on a substrate 7 by means of fastening parts as shown in FIG. 2, and are used as an optical coupler.

In an optical fiber coupler, in general, joining by fusing of fibers having different mode field diameters results in radiation loss at the connecting portion due to difference in mode field diameter, but the optical fiber coupler of the present invention is capable of making the mode field diameters almost identical, so that it has advantage of decreasing the connection loss.

Figure 3A:
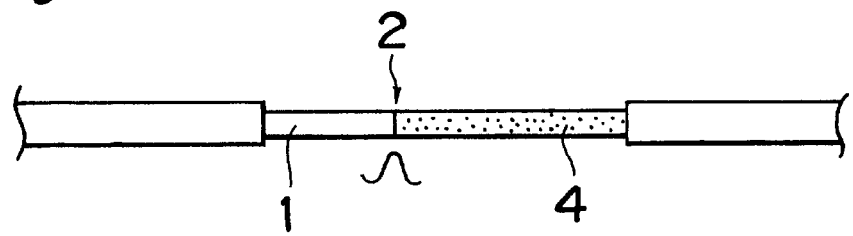
FIGS. 3A and 3B are schematic diagrams illustrating an optical fiber to be used in the present invention.
Figure 3B:
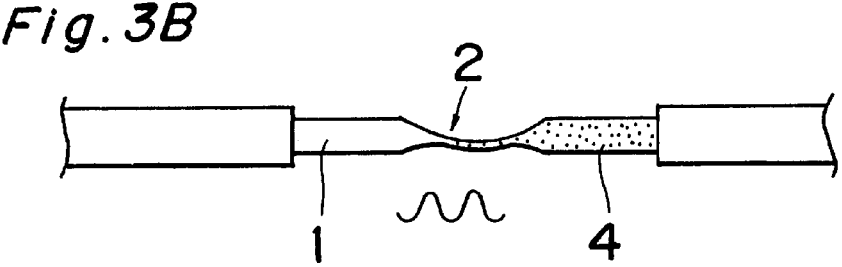

In general in the prior art optical coupler, mode field diameters are different among the signal light in the single mode fiber, the signal light in the rare earth-doped fiber, the pumping light in the single mode fiber and the pumping light in the rare earth-doped fiber. According to the present invention, however, optical fibers of different mode field diameters can be jointed by fusing and then stretching to reduce the diameters, so that the evanescent field of the light which propagates in the fiber increases in both fibers, thereby decreasing the differences in mode field diameters in the joint section on the signal light side and pumping light side and in the rare earth-doped fiber. That is, if the fused connected section 2 of the connected optical fiber as shown in FIG. 3A is stretched, the core of the fiber located in the vicinity of the connected section 2, which restrains the propagating light therein, becomes finer, as shown in FIG. 3B and then the evanescent field of the light in propagating the fiber increases, thus increasing the mode field diameter in both the single mode fiber and the rare earth-doped fiber. In the present invention, the mode field diameters in the fibers 1a and 1b for the signal light and pumping light and in the rare earth-doped fibers 4a, 4b can be properly controlled in advance by stretching the fused fiber of the fused and elongated portion 3, thereby effectively decreasing the connection loss of light.

Also In the present invention, connection loss can be decreased by forming the fused and elongated portion 3 with the rare earth-doped fiber 4. If the fused and elongated portion 3 (which is a WDM for multiplexing) is provided on the single mode optical fiber 1 side, both signal light and pumping light enter together at the connected section into one end of the rare earth-doped fiber 4, thus making it difficult to match the mode field diameters for each wavelength of the lights in jointing the fibers, resulting in an increased loss. In general, pumping light has a wavelength different from the signal light, and the WDM uses a fiber fitted to the transmission wavelength of the pumping light. That is, the WDM is made by using a fiber having a different mode field diameter from that of the single mode fiber which transmits the signal light. In the present invention, in contrast, because an optical coupling portion in the fused and elongated portion 3 as a common single joint fiber is located on the rare earth-doped fiber 4 side, it is possible to implement proper fuse-connections 2 and 2 between the signal light transmitting fiber 1a and the rare earth-doped fiber 4a, and between the pumping light transmitting fiber 1b and the rare earth-doped fiber 4b, individually.

In the present invention, connection loss can be adjusted first in fusing and connecting a signal light transmitting optical fibers 1a with a rare earth-doped fibers 4a, and thereafter a pumping light transmitting optical fiber 1b and another rare earth-doped fiber 4b are heated for fused and connected similarly.

The two fibers connected above are brought in parallel contact to each other and heated at the vicinity of the connected sections 2 of the two fibers to be jointed into a common single joint fiber for the joint portion, which include the connecting portions 2 between the transmitting fibers 1a and 1b and rare earth doped fiber 4a and 4b. In stretching step that follows, the mode field diameters of both the fuse-connected portions 2 increase further because of the stretched fuse-connected portion 3 being located nearer, thereby decreasing the loss.

Now embodiments for applying the optical fiber coupler of the present invention to an optical amplifier will be described below.

Figure 4:
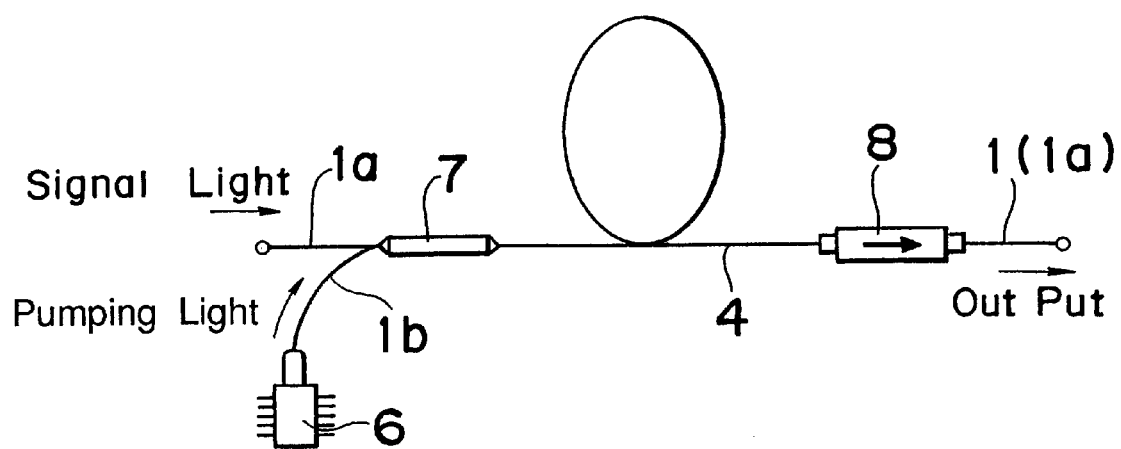
FIG. 4 is a schematic diagram showing an optical amplifier using a optical fiber coupler according to the present invention.

FIG. 4 shows an optical fiber amplifier with the optical fiber coupler used as a multiplexer 7, which is provided with single mode optical fibers 1a and 1b on one side (left hand in the figure), while one of said fibers is directly connected with a pumping light source 6 and the other is used to enter signal light. This multiplexer 7 is also provided on the other side (right hand in the same figure) with the rare earth-doped fiber 4 (4a), with one end thereof being connected to an optical element such as inline type optical isolator 8. As the optical fiber coupler of the present invention is used as a multiplexer 7, the multiplexer 7 itself has the optical fibers 1a and 1b and the rare earth-doped fiber 4 connected thereto and the optical isolator 8 is connected directly thereto, therefore, omitting the two splicing portions 9 and 91 in shown in FIG. 7 in the case of the prior art.

Splice between a rare earth-doped fiber 4 and a single mode optical fiber 1 typically leads to a loss of about 0.1 to 0.2 dB through each splicing joint, then a maximum of 0.4 dB through two joints. In the invention, total loss of light can be restricted lower than 0.1 dB by decreasing the number of splicing portions. Thus the amplifying characteristics such as the gain and the signal to noise ratio are improved. Also there is no need for fuse-splicing step in forming the optical circuit and it can be unnecessary to secure a space for protective tubes containing the splicing portions in a coupler device.

Further, a pumping light module may be directly connected as the pumping light source 6 to the pumping light input fiber 1b to the multiplexer 7, then decreasing a loss of the pumping light to improve the amplification characteristics further. This makes it possible to decrease a loss of the pumping light in use and eliminate the splicing step and the splicing portion in making the coupler.

Now the operation of the optical amplifier of the present invention will be described below with reference to FIG. 4. The signal light enters the multiplexer 7 through the optical fiber 1a, and is multiplexed in the multiplexer 7 with the pumping light entering through the optical fiber 1b. In the multiplexer 7, the optical coupling section is located on the side of the rare earth-doped fiber 4 of the coupler which makes up the multiplexer 7, so that the entering signal light is transmitted through the single mode optical fiber 1a to the joint of the rare earth-doped fiber 4 while increasing the mode field diameter, thereby to enter the rare earth-doped fiber 4 and is transmitted to the optical coupling section in the fused and elongated portion 3, where the signal light is coupled with the pumping light. In the optical coupling section, the signal light is coupled with the pumping light entering from the other rare earth-doped fiber 4b.

Thus, only signal light component enters the rare earth-doped fiber 4a, and coupling of the signal light with the pumping light takes place in the rare earth-doped fiber 4 at the fuse joint portion 3, then, achieving optical couple with properly adjusted mode field diameters with respect to the signal light in both the signal light transmitting single mode fiber 1a and the rare earth-doped fiber 4a, and also that exiting light in both the transmitting single mode fiber 1b and the rare earth-doped fiber 4b, thus achieving low-loss optical coupling.

Thereafter, the pumping light pumps the rare earth element ions in the rare earth-doped fiber 4 in the fused and elongated portion 3 to cause distribution inversion of the energy level, thereby amplifying the signal light component which enters the inline type optical isolator 8 while only the forward component of the signal light is output.

At this time, because of the smaller number of joint or splicing portions and good matching of the mode field diameter, the entire optical circuit can exhibit reduction in total loss and increase in amplification characteristics such as amplifying gain and signal to noise ratio.

Although the embodiment described above is an optical amplifier of forward pumping type, the present invention can also be applied to backward pumping amplifier in which pumping light enters from the side of rare earth-doped fiber 4, which is opposite to entrance of pumping light in the case of the forward pumping described above.

Figure 5:
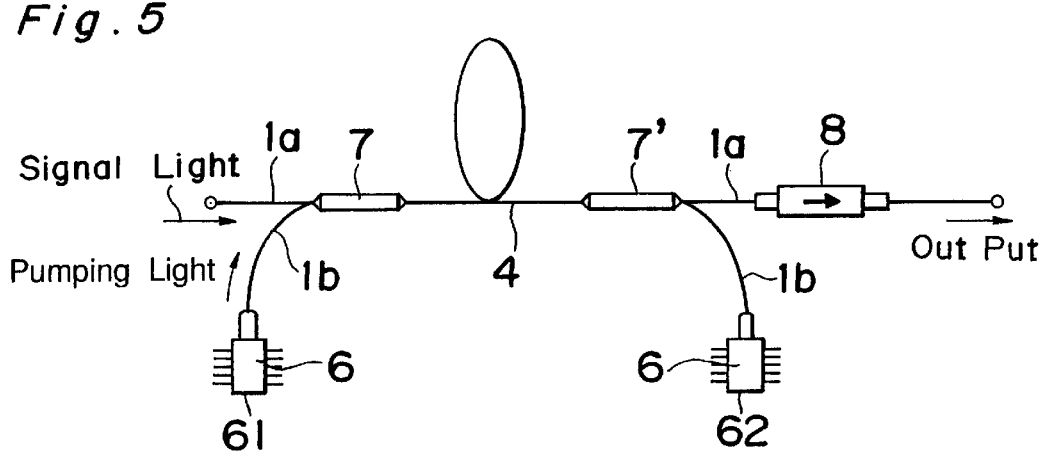
FIG. 5 is a schematic diagram showing an optical amplifier for bi-directional pumping technique using two optical fiber couplers according to the present invention.

The optical coupler of the invention can be applicable to bi-directional pumping amplifier in which two couplers are formed on both sides of the rare earth-doped fiber 4. An embodiment of bi-directional pumping amplifier has a construction, as shown in FIG. 5, in which the optical amplifier as shown in FIG. 4 is provided with another multiplexer 7' connected on the output side of the rare earth-doped fiber 4, with another pumping light source 6' for backward pumping and the optical isolator 8 connected to the other end of the multiplexer 7.

The operation on the forward excitation side is as described previously. Pumping light from the pumping light source 6' for backward pumping enters the rare earth-doped fiber 4 from the multiplexer 7' of the backward pumping side. The backward pumping light pumps the rare earth element ions into a higher energy level to generate a revered distribution, thereby amplifying the signal light. The signal light, which has been amplified by forward pumping and backward pumping, can passe through the inline type optical isolator 8 and is output.

EXAMPLES

Figure 6:
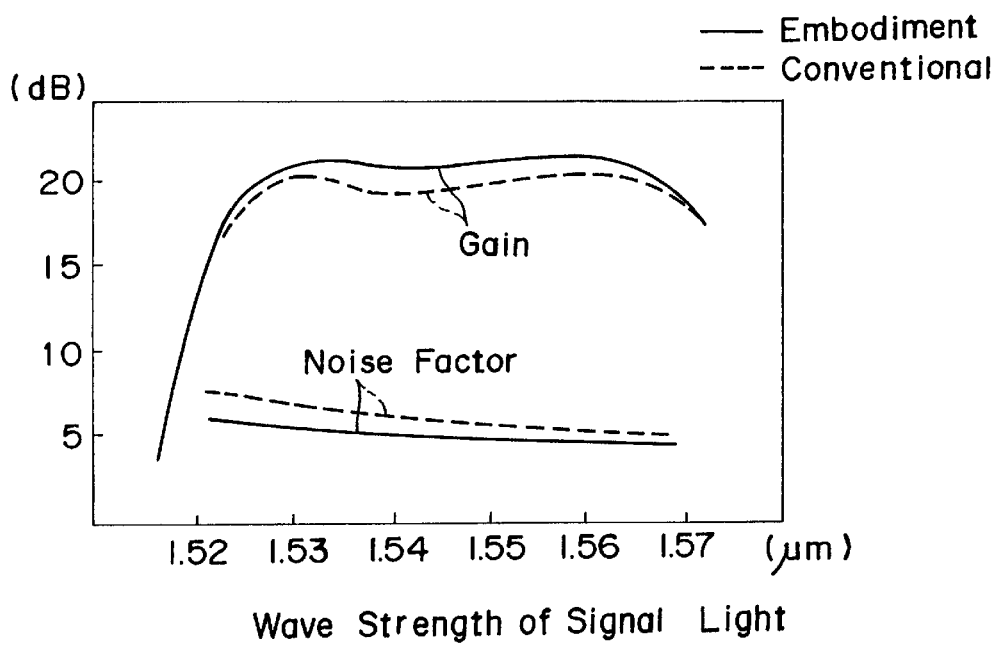
FIG. 6 is a graph showing gain and noise characteristic of the optical amplifier of the present invention and that of the prior art; and, FIG. 7 is a schematic diagram showing a prior art optical amplifier.
Figure 7:
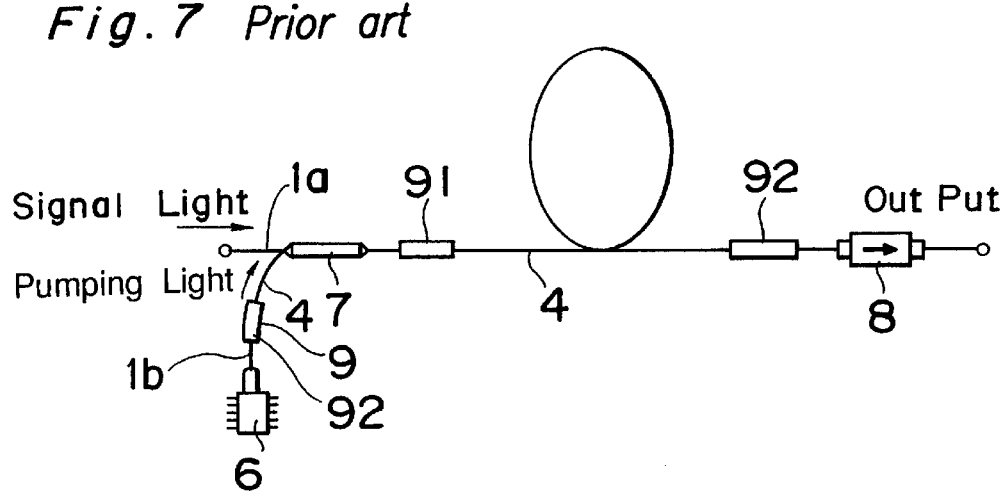

As an example of the present invention, the optical amplifier shown in FIG. 4 was fabricated to compare characteristics thereof with those of the prior art shown in FIG. 7. As will be seen from the results shown in FIG. 6, the optical amplifier of the present invention has higher gain and lower noise figure in the wavelength band of the signal light, thus providing higher performance than the conventional optical amplifiers.

As described above, the present invention has the following advantages. Since the optical coupler is made by jointing the rare earth-doped fiber and the single mode optical fiber by fusing and stretching the fibers to a desirable diameter in the vicinity of an end of the rare earth-doped fiber, it is not necessary to form any splicing portions individually. Therefore, splicing step in fabricating an optical fiber coupler becomes unnecessary resulting in simplified steps, and moreover the space for accommodating the splicing portions becomes unnecessary, thus possibly to make the optical coupler smaller in size and lower in cost.

Since the mode field diameters at the fused connected sections between the signal light transmitting single mode fiber and the rare earth-doped fiber, and the mode field diameters at the connected section between the pumping light transmitting single mode fiber and the rare earth-doped fiber can be matched individually, total loss can be decreased.

An optical circuit for bi-directional pumping can also be made compact by forming an identical optical fiber coupler also on the other end of the rare earth-doped fiber.

By connecting the optical isolator directly to one side of the rare earth-doped fiber, splicing portion can be eliminated when packaging the optical circuit and the loss can be decreased, thereby improving the amplifying characteristics.

What is claimed is:

1. A method of producing an optical fiber coupler comprising the steps of:

fusing an ordinary optical fiber and a rare-earth doped optical fiber end to end at a connected section to form a single joint fiber;

disposing a pair of single joint fibers in parallel contact with the connected sections thereof aligned;

heating to fuse a region of the pair into a fused fiber region; and elongating the heated fused fiber region creating a fused and elongated region to adjust a diameter thereof.

2. An optical fiber coupler for multiplexing pumping laser light and signal laser light having ordinary optical fibers on an input side and at least one rare-earth doped optical fiber on an output side, comprising:

a pair of input optical fibers comprising ordinary optical fibers;

a pair of output optical fibers comprising rare-earth doped optical fibers;

a pair of connected sections, each connected section formed by fusing an input optical fiber end to end with an output optical fiber to create a connection; and a fused and elongated portion having a first end region and a second end region, the fused and elongated portion composed primarily of rare-earth doped optical fiber with no ordinary optical fiber connecting the first end region with the second end region, said portion formed by aligning the connections of the pair of connected sections in parallel, heating a length of the aligned sections to fuse them along the length and elongating the heated fused region to reduce a diameter of said portion to a desired diameter, whereby pumping laser light entering a first input optical fiber at the input side and signal laser light entering a second input optical fiber at the input side are multiplexed in the fused and elongated portion and exit the output side as multiplexed signal light.

3. The optical coupler of claim 2, wherein the connections are located outside of the fused and elongated portion.

4. The optical coupler of claim 2, wherein the connections are located no more than 15 mm from the fused and elongated portion.

5. The optical coupler of claim 2, wherein there is only a single rare-earth doped fiber at the output side.

6. An optical amplifier comprising a first one and a second one of the optical fiber couplers of claim 2, the output sides of which couplers are attached to a first and a second end of a rare-earth doped optical fiber, respectively, wherein signal light is input to a first ordinary optical fiber and pumping light is input to a second ordinary optical fiber of the first optical fiber coupler and pumping light is input to a first ordinary optical fiber of the second optical fiber coupler and amplified signal light is output through a second ordinary optical fiber of the second optical fiber coupler.

7. The optical fiber coupler according to claim 2, wherein the fused and elongated portion is formed from rare earth-doped fiber.

8. An optical amplifier comprising the optical fiber coupler of claim 2, wherein signal light and pumping light are supplied through the ordinary optical fibers to be multiplexed in the fused and elongated portion and an amplified signal exits the output side through a rare earth-doped fiber.

9. The optical amplifier according to claim 8, wherein an optical isolator is connected to an end of the rare earth-doped fiber on the output side.

10. The optical amplifier according to claim 8, wherein the optical fiber on the input side is directly connected to a pumping light source.

* * * * *